(12) United States Patent
Kamatani et al.

(10) Patent No.: US 10,215,952 B2
(45) Date of Patent: Feb. 26, 2019

(54) IMAGING APPARATUS

(71) Applicant: Sony Corporation, Tokyo (JP)

(72) Inventors: Yoshiteru Kamatani, Kanagawa (JP); Kazuhiko Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/463,108

(22) Filed: Mar. 20, 2017

(65) Prior Publication Data

US 2017/0192197 A1    Jul. 6, 2017

Related U.S. Application Data

(63) Continuation of application No. 14/157,036, filed on Jan. 16, 2014, now Pat. No. 9,625,672, which is a (Continued)

(30) Foreign Application Priority Data

Jul. 10, 2009    (JP) ................. 2009-163284

(51) Int. Cl.
    *G03B 17/00*       (2006.01)
    *G02B 7/09*        (2006.01)
    (Continued)

(52) U.S. Cl.
    CPC ............. *G02B 7/09* (2013.01); *G02B 7/021* (2013.01); *G02B 7/026* (2013.01); *G02B 7/04* (2013.01);
    (Continued)

(58) Field of Classification Search
    CPC ........ G03B 17/00; G03B 17/02; G03B 17/04; G03B 19/00
    (Continued)

(56) References Cited

U.S. PATENT DOCUMENTS

2007/0047938 A1    3/2007   Suzuki et al.
2007/0116451 A1    5/2007   Yamamoto et al.
(Continued)

FOREIGN PATENT DOCUMENTS

JP    2005-195912 A    7/2005
JP    2007-017791      1/2007
(Continued)

OTHER PUBLICATIONS

Korean Office Action dated Dec. 19, 2016, for corresponding Korean Application No. 10-2016-0121558.
(Continued)

*Primary Examiner* — Clayton E Laballe
*Assistant Examiner* — Fang-Chi Chang
(74) *Attorney, Agent, or Firm* — Michael Best & Friedrich LLP

(57) ABSTRACT

An imaging apparatus includes a first member including a holding member, the retaining member holding a lens; a second member surrounding the first member; an imaging device arranged opposite to the first member and the lens; and a driving member arranged in a region adjacent to the first member driving the first member in the vertical direction relative to the imaging device. The first member includes at least a first portion and a second portion, the first portion having a first outer diameter and the second portion having a second outer diameter smaller than the first outer diameter, the first and second portions respectively having a first corner and a second corner, the first and second corners respectively having a first cutout portion and a second cutout portion. At least a portion of the driving member is disposed at a region corresponding to the second portion.

20 Claims, 8 Drawing Sheets

Related U.S. Application Data continuation of application No. 12/814,973, filed on Jun. 14, 2010.

(51) Int. Cl.
  *G02B 7/02* (2006.01)
  *G02B 7/04* (2006.01)
  *G02B 13/00* (2006.01)
  *G03B 13/34* (2006.01)
  *H04N 5/225* (2006.01)
  *G02B 7/10* (2006.01)

(52) U.S. Cl.
  CPC ............ *G02B 7/10* (2013.01); *G02B 13/001* (2013.01); *G03B 13/34* (2013.01); *H04N 5/2251* (2013.01); *H04N 5/2252* (2013.01); *H04N 5/2254* (2013.01)

(58) Field of Classification Search
  USPC ........................................... 396/533
  See application file for complete search history.

(56) References Cited

U.S. PATENT DOCUMENTS

| | | |
|---|---|---|
| 2007/0154198 A1 | 7/2007 | Oh |
| 2008/0037143 A1 | 2/2008 | Yoon |
| 2008/0259470 A1 | 10/2008 | Chung |
| 2009/0034094 A1 | 2/2009 | Noda et al. |
| 2009/0097841 A1 | 4/2009 | Chang |
| 2009/0109330 A1 | 4/2009 | Nakano |
| 2010/0007973 A1 | 1/2010 | Sata et al. |
| 2010/0033616 A1 | 2/2010 | Huang et al. |

FOREIGN PATENT DOCUMENTS

| | | |
|---|---|---|
| JP | 2007-058076 A | 3/2007 |
| JP | 2007-140417 A | 6/2007 |
| JP | 2007-279216 A | 10/2007 |
| JP | 2007-316441 A | 12/2007 |
| JP | 2008-048595 A | 2/2008 |
| JP | 2008-096705 A | 4/2008 |
| JP | 2008-197313 A | 8/2008 |
| JP | 2008-299286 A | 12/2008 |
| JP | 2009-128707 A | 6/2009 |
| JP | 2011-017946 A | 1/2011 |

OTHER PUBLICATIONS

Korean Office Action dated Jun. 27, 2016, for corresponding Korean Application No. 10-2010-0064000.
Korean Office Action dated Aug. 23, 2016, for corresponding Korean Application No. 10-2010-0064000.
Korean Office Action dated Dec. 14, 2015, for corresponding Korean Application No. 10-2010-0064000.
Japanese Office Action dated Feb. 4, 2016, for corresponding Japanese Application No. 2014-023496.
Japanese Office Action dated Dec. 25, 2014, for corresponding Japanese Application No. 2014-023496.
Japanese Office Action dated Dec. 10, 2014, for corresponding Japanese Application No. 2009-163284.
Korean Office Action dated Jun. 30, 2017 for corresponding Korean Application No. 10-2016-0121558.

IMAGING APPARATUS

CROSS REFERENCE TO RELATED APPLICATIONS

The present application is a Continuation of application Ser. No. 14/157,036, filed Jan. 16, 2014, which is a Continuation of application Ser. No. 12/814,973, filed on Jun. 14, 2010, now Abandoned, and claims priority to Japanese Patent Application JP 2009-163284 filed in the Japanese Patent Office on Jul. 10, 2009, the entire contents of which are hereby incorporated by reference.

BACKGROUND OF THE INVENTION

1. Field of the Invention

The present invention relates to an imaging apparatus, and particularly to an imaging apparatus that allows reduction in size of a lens driving portion.

2. Description of the Related Art

FIG. 1 shows the configuration of an exemplary imaging apparatus of related art. An imaging apparatus 10 shown in FIG. 1 includes a housing 11, a lens barrel 12, and an imaging device 13. The imaging apparatus 10 is manufactured by assembling the lens barrel 12 and the imaging device 13 into the housing 11.

Lenses 21, 22, and 23 are assembled into the lens barrel 12 and held therein. A thread 24 is provided on the outer side surface of the lens barrel 12. The thread 24 engages a thread (not shown) provided on a lens carrier 31 disposed in the housing 11. The thread engagement between the lens barrel 12 and the lens carrier 31 allows the distance to the imaging device 13 to be adjusted at the time of manufacture (the focus of the lenses to be adjusted). After the focus adjustment, the lens barrel 12 is glued to the lens carrier 31 so that the lens barrel 12 is fixed to the lens carrier 31.

Coils 32-1 and 32-2 are provided on the side surface of the lens carrier 31. The coils 32-1 and 32-2 are shown as separate members for illustration purposes only, but a single coil 32 is in practice provided on the side surface of the lens carrier 31. A magnet 33-1 is provided in the housing 11 and faces the coil 32-1. Similarly, a magnet 33-2 is provided in the housing 11 and faces the coil 32-2. Each of the magnets 33-1 and 33-2 is provided with a yoke, which is omitted in FIG. 1. The coil 32, the magnets 33, and the yokes form a voice coil motor.

When a current is conducted through the coil 32, a force is produced in the upward or downward direction in FIG. 1. The produced force moves the lens carrier 31 in the upward or downward direction. When the lens carrier 31 is moved, the lens barrel 12 fixed to the lens carrier 31 is also moved. The distance between the lenses 21 to 23 held in the lens barrel 12 and the imaging device 13 therefore changes. The mechanism described above enables autofocusing (AF) (see JP-A-2007-17791, for example).

SUMMARY OF THE INVENTION

It is desirable in recent years to reduce the size of an AF driver as the size of digital cameras has been reduced and mobile phones having a digital camera capability have become popular. The size of an AF driver can be reduced by reducing the size of an optical system, such as lenses, but in return the amount of light likely decreases, disadvantageously resulting in degradation in image quality. It is therefore not preferable to reduce the size of lenses or similar optical components in order to reduce the size of an AF driver. Nevertheless, further reduction in size of the driver (an imaging apparatus including the driver) is desired, as described above.

It is difficult to achieve further size reduction unless a change is made to the configuration shown in FIG. 1. The size of the imaging apparatus can be reduced by reducing the sizes of the lenses 21 to 23 to reduce the size of the lens barrel 12 with no change made to the configuration shown in FIG. 1. In this case, however, it is difficult to avoid the degradation in image quality described above.

JP-A-2007-17791 describes an imaging apparatus that has a sector disposed between a subject and a lens and blocking light incident to the lens and how to reduce the size of the imaging apparatus. The imaging apparatus described in JP-A-2007-17791 includes a lens group containing a plurality of lenses having different diameters, and the sector is disposed between a subject and the lens group and blocks light incident to the lens group. The lens group is accommodated in a lens barrel. The outer circumferential sidewall of the lens barrel has a plurality of stepped sections having different diameters corresponding to the diameters of the lenses accommodated in the lens barrel, and a sidewall recess is formed along one of the stepped sections. Sector drive means for driving the sector is disposed in the sidewall recess.

The imaging apparatus described in JP-A-2007-17791 is desired to be further reduced in size. The imaging apparatus described in JP-A-2007-17791 has a disadvantageous structure in which, for example, the lens barrel has no thread mechanism, which does not allow focus adjustment between the lens group and the imaging device at the time of manufacture.

Lens driving methods have also been proposed without using the driving method described with reference to FIG. 1. For example, a driving method using a piezoelectric device and a driving method using a shape memory alloy have been proposed. It is desirable that the other driving methods described above can also be used and the size of a drive-related portion can be reduced.

Thus, it is desirable to reduce a lens driving portion.

An imaging apparatus according to an embodiment of the invention includes a first member that holds a lens, a second member to which the first member is fixed, and drive means for driving the second member in the vertical direction relative to an imaging plane of an imaging device. The first member has diameters different from each other, and a portion having a small diameter has a portion that engages the second member. The drive means is disposed in a space created by the difference between the different diameters.

The first member may hold a plurality of lenses having diameters different from one another and may be shaped to have diameters corresponding to the diameters of the lenses.

The drive means may be a voice coil motor formed of a coil, a magnet, and a yoke. The voice coil motor may be disposed in the space described above. The coil of the voice coil motor may be disposed on the side surface of the second member.

The drive means may include a piezoelectric device, a shaft connected to the piezoelectric device, and a hook which is connected to the second member and through which the shaft passes. The piezoelectric device, the shaft, and the hook may be disposed in the space described above.

The drive means may include a wire made of a shape memory alloy, a hook to which the wire is hooked, and electrodes connected to the wire. The wire, the hook, and the electrodes may be disposed in the space described above.

In an imaging apparatus according to another embodiment of the invention, a thread is provided on a portion of a member that holds lenses, specifically, on the portion whose diameter corresponds to the lens having the smallest diameter, and the thread allows the portion to engage a member that drives the lenses. Drive means is provided in the space created by the different diameters.

According to the embodiments of the invention, the size of a lens driving portion can be reduced.

DESCRIPTION OF THE PREFERRED EMBODIMENTS

Embodiments of the invention will be described below with reference to the drawings.

The invention can be applied to an imaging apparatus. The imaging apparatus described herein is specifically an apparatus accommodated in, for example, a digital still camera and a mobile phone having a digital still camera capability. In such an imaging apparatus, autofocusing (AF) is performed by driving a lens (for example, moving a lens relative to an imaging device in such a way that the lens approaches the imaging device or travels away therefrom).

Figure 1:
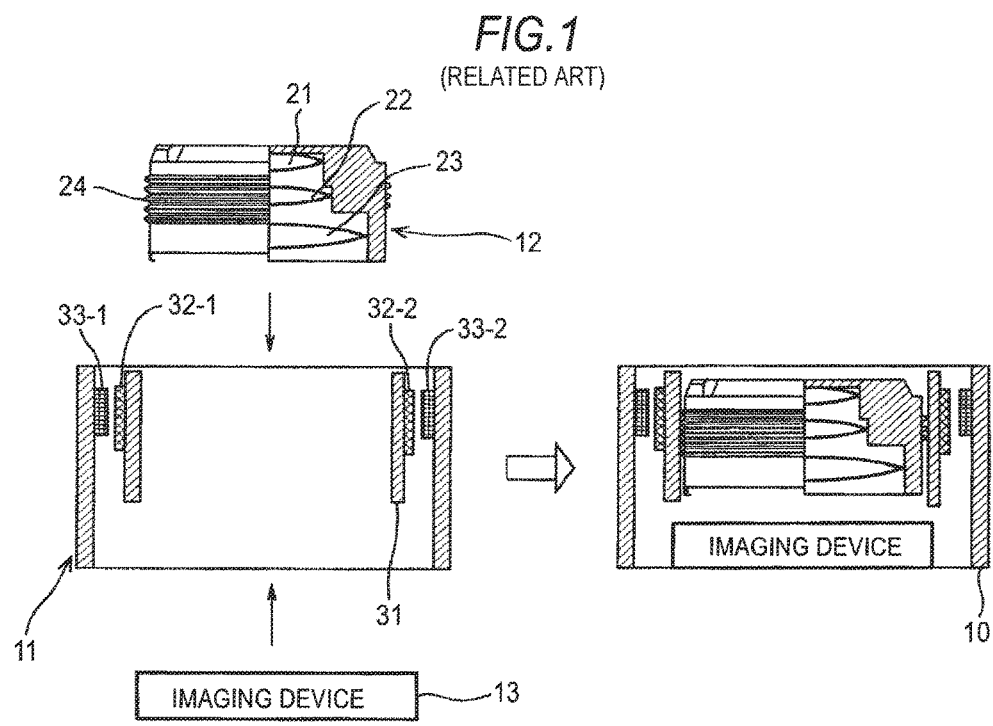
FIG. 1 shows the configuration of an exemplary imaging apparatus of related art.

An imaging apparatus including a driver for performing autofocusing has a configuration, for example, shown in FIG. 1. Referring to FIG. 1 again, the imaging apparatus 10 is formed of the housing 11, which accommodates the lens carrier 31. The lens carrier 31 is configured to be movable relative to the housing 11 in the upward and downward directions in FIG. 1 (approaching the imaging device 13 or traveling away therefrom). The lens barrel 12, which accommodates the plurality of lenses 21 to 23, is disposed in the lens carrier 31 and fixed thereto.

The embodiments described below primarily relate to the lens barrel and the lens carrier of the imaging apparatus described above. An imaging apparatus using a lens barrel and a lens carrier to which any of the embodiments described below is applied can be smaller than an imaging apparatus of related art. When such a smaller imaging apparatus is accommodated in an apparatus, such as a digital still camera and a mobile phone, the size of the apparatus can be reduced. Further, the space for the portion other than the imaging apparatus can be increased, whereby other functions can be enhanced.

A description will next be made of an imaging apparatus expected to show the advantageous effects described above. Methods for performing autofocusing having been proposed include a method using a voice coil motor (the method described with reference to FIG. 1), a method using a piezoelectric device, and a method using a wire made of a shape memory alloy. In the following description, the embodiments will be described with reference to the methods described above. That is, the following description includes a first embodiment in which a voice coil motor is used to perform autofocusing, a second embodiment in which a piezoelectric device is used to perform autofocusing, and a third embodiment in which a wire made of a shape memory alloy is used to perform autofocusing.

In the following description, a member that holds a lens is referred to as a lens barrel, a member to which the lens barrel is fixed is referred to as a lens carrier, and a portion that drives the lens carrier is referred to as a driver, as appropriate. The lens barrel is a cylinder shaped in such a way that an upper diameter (outer diameter) and a lower diameter (outer diameter) are designed to match the respective lens diameters and hence different from each other. A portion (thread) that engages the lens carrier is provided on one of the upper and lower portions of the lens barrel, the portion having a smaller diameter. The difference in diameter creates a space, and drive means is provided in the created space. The drive means in the first to third embodiment differ from one another as described above and will be described below.

First Embodiment

Figure 2:
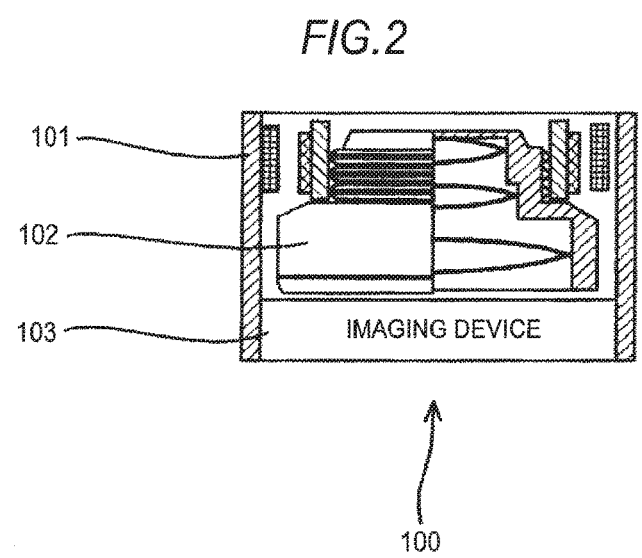
FIG. 2 shows the configuration of an imaging apparatus of an embodiment to which the invention is applied.
Figure 3:
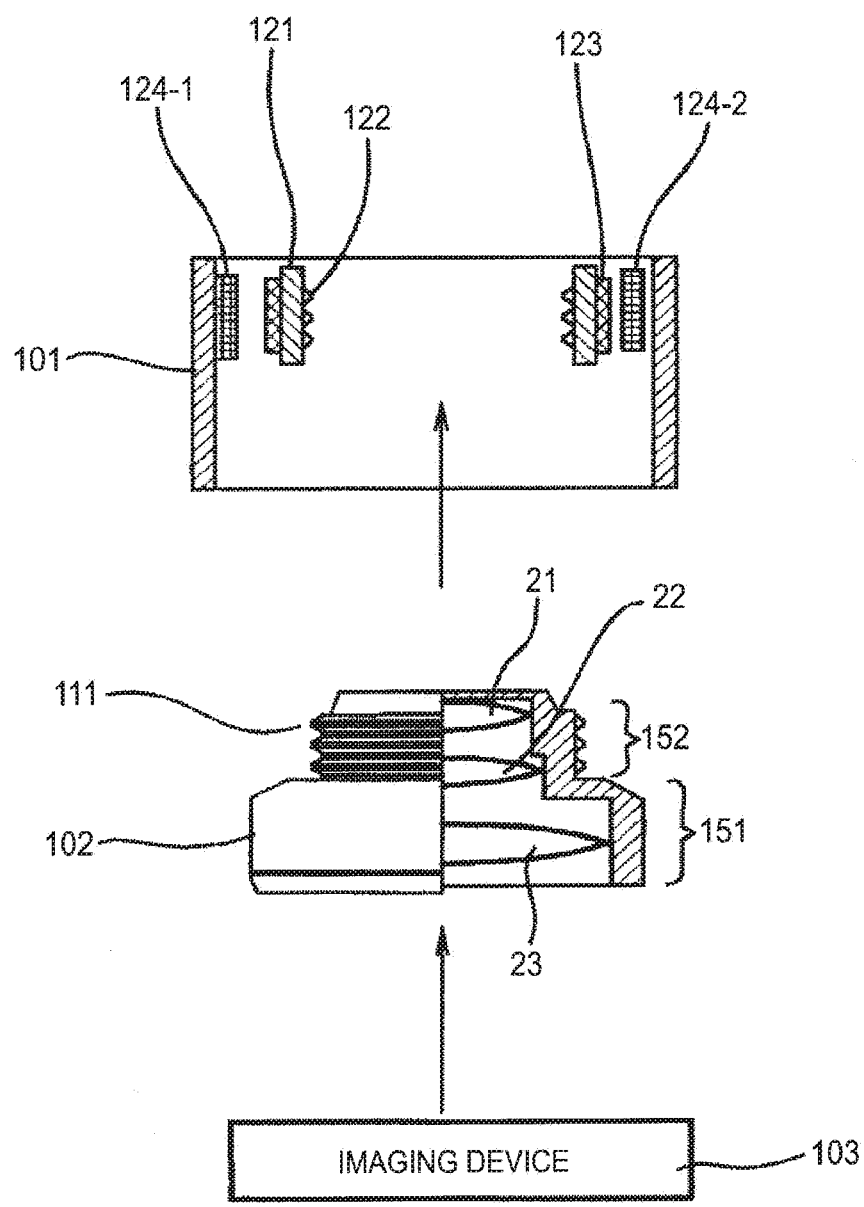
FIG. 3 describes the configuration of the imaging apparatus.

A first embodiment will be described below. FIG. 2 shows an exemplary configuration of an imaging apparatus 100 in the first embodiment and is a cross-sectional view of the imaging apparatus 100. The imaging apparatus 100 shown in FIG. 2 includes a housing 101, a lens barrel 102, and an imaging device 103. FIG. 3 is an exploded view of respective parts of the imaging apparatus 100 shown in FIG. 2.

Referring to FIG. 3, lenses 21, 22, and 23 are assembled into the lens barrel 102 and held therein. A thread 111 is provided on the outer side surface of the lens barrel 102.

A lens carrier 121 is provided in the housing 101. A thread 122 is provided on the inner side (inner diameter) of the lens carrier 121. A coil 123 is provided on the outer (outer shape) side surface of the lens carrier 121. The coil 123 surrounds the side surface of the lens carrier 121. Magnets 124-1 and 124-2 are provided in predetermined positions on the inner side (inner diameter) of the housing 101 and face the coil 123. The magnets 124-1 and 124-2 are disposed on opposite sides of the coil 123.

Each of the magnets 124-1 and 124-2 is provided with a yoke, but shown as a combined magnet and yoke in FIGS. 2 and 3 as magnet 124-1 or magnet 124-2. When it is not necessary to distinguish the magnets 124-1 and 124-2 from each other, the magnets 124-1 and 124-2 are hereinafter simply referred to as magnets 124.

The thread 111 on the lens barrel 102 engages the thread 122 provided on the lens carrier 121. The engagement between the lens barrel 102 and the lens carrier 121 allows the distance to the imaging device 103 to be adjusted at the time of manufacture (the focus of the lenses to be adjusted). After the focus adjustment, the lens barrel 102 is glued to the lens carrier 121 so that the lens barrel 102 is fixed to the lens carrier 121.

After the lens barrel 102 is inserted into the housing 101 and fixed to the lens carrier 121, the imaging device 103 is inserted into the housing 101 and fixed thereto. The imaging apparatus 100 having the configuration shown in FIG. 2 is manufactured by sequentially assembling the lens barrel 102 and the imaging device 103 into the housing 101 as described above.

In the imaging apparatus 100 having the configuration described above, when a current is conducted through the coil 123 provided on the lens carrier 121, the interaction between the current and the magnets 124 produces a force oriented in the upward or downward direction in FIGS. 2 and 3 depending on the direction in which the current flows. The produced force moves the lens carrier 121 in the upward or downward direction. When the lens carrier 121 is moved, the lens barrel 102 fixed to the lens carrier 121 is also moved. The distance between the lenses 21 to 23 held in the lens barrel 102 and the imaging device 103 therefore changes. Autofocusing (AF) is performed by the mechanism described above.

The structure of the lens barrel 102 will further be described. Referring to FIG. 3, the lens barrel 102 has a stepped shape, a shape having two stepped sections in the configuration shown in FIG. 3. A stepped section 151 contains the lens 23, and a stepped section 152 contains the lenses 21 and 22. As shown in FIG. 3, the sizes of the lenses 21 to 23 satisfy the following relationship.

lens 21<lens 22<lens 23

The diameter of the stepped section 151 containing the lens 23 is therefore larger than that of the stepped section 152 containing the lenses 21 and 22. The diameter of the stepped section 151 is slightly larger than that of the lens 23. The diameter of the stepped section 152 is slightly larger than that of the lens 22 but smaller than that of the lens 23.

The thread 111 is provided on the stepped section 152. The thread 111 provided on the stepped section 152 engages the thread 122 provided on the lens carrier 121. The diameter of the lens carrier 121 is sized in such a way that the thread ill engages the thread 122. The diameter of the lens carrier 121 is therefore sized to be slightly larger than that of the stepped section 152.

Further, the height of the stepped section 152 is shorter than that of the lens carrier 121. The height used herein means the length in the up-down direction in FIG. 3 (the direction toward or away from the imaging device). The height of the lens carrier 121 is determined in such a way that the stepped section 151 of the lens barrel 102 does not come into contact with an end of the lens carrier 121 when the lens barrel 102 is fixed to the lens carrier 121.

Figure 4:
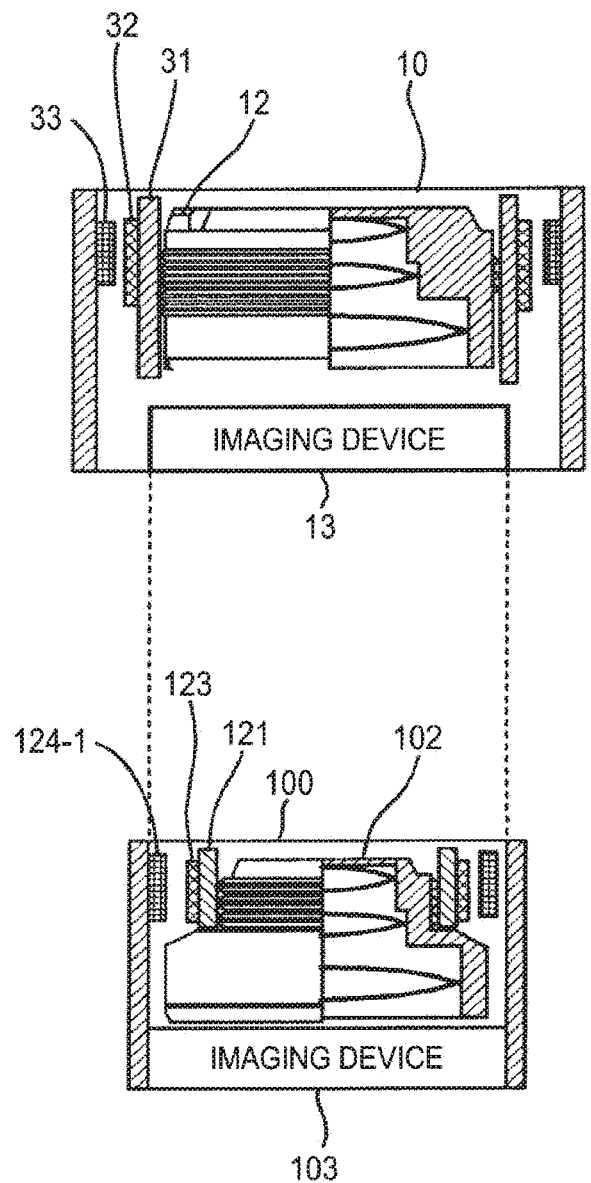
FIG. 4 describes the size of the imaging apparatus.

The imaging apparatus 10 of related art is now compared with the imaging apparatus 100 in the first embodiment. The upper portion of FIG. 4 shows the configuration of the imaging apparatus 10 of related art shown in FIG. 1, and the lower portion of FIG. 4 shows the configuration of the imaging apparatus 100 in the first embodiment of the invention shown in FIG. 2.

Each of the imaging apparatus 10 and the imaging apparatus 100 includes the lenses 21 to 23. The imaging apparatus 10 and the imaging apparatus 100 therefore do not differ from each other in terms of optical system and can hence capture images having the same image quality. Further, the imaging device 13 in the imaging apparatus 10 and the imaging device 103 in the imaging apparatus 100 have the same number of pixels and can capture images having the same image quality in this regard as well.

It is, however, obvious that the imaging apparatus 100 is smaller than the imaging apparatus 10. The reason for this is that the lens barrel 102 in the imaging apparatus 100 has a stepped shape and the diameter of the stepped section 152 accommodating the smaller lenses is smaller than the diameter of the stepped section 151 accommodating the larger lens. The size of the imaging apparatus 100 can be reduced accordingly. The size of the imaging apparatus 100 is reduced because the space created by the difference between the stepped sections 151 and 152, specifically, the difference in diameter between the stepped sections 151 and 152, accommodates the lens carrier 121, the thread 122, the coil 123, and the magnets 124.

That is, the size of the imaging apparatus 100 can be reduced by shaping the lens barrel 102 in such a way that the diameter thereof gradually decreases in correspondence with the sizes of the lenses to be accommodated, providing the thread 111 on the stepped section having the smaller diameter so that the threaded portion engages the lens carrier 121, and assembling a driver including the coil 123 and the magnets 124 on the side where the diameter is smaller.

In the above description of "shaping the lens barrel 102 in such a way that the diameter thereof gradually decreases in correspondence with the sizes of the lenses to be accommodated," "the diameter thereof gradually decreases" means that the following shapes can be employed. That is, for example, a stepped shape, like the stepped sections 151 and 152 shown in FIG. 3, can be employed. Although not shown, when three lenses, such as the lenses 21 to 23 shown in FIG. 3, are incorporated, a stepped shape not formed of two stepped sections but formed of three stepped sections corresponding to the number of lenses can be employed.

Alternatively, although not shown, instead of a stepped shape, for example, a cone shape (part of a cone shape) whose diameter gradually and continuously decreases in the direction away from the imaging device 103 can be employed. Still alternatively, for example, a combined shape in which the threaded portion (corresponding to the stepped section 152 in FIG. 3) has a cylindrical shape and the non-threaded portion (corresponding to the stepped section 151 in FIG. 3) has part of a cone shape can be employed. Still alternatively, any shape one can think of from the shapes described above can be employed.

In the imaging apparatus 10 of related art shown in the upper portion of FIG. 4, the lens carrier 31 is positioned outside the lens barrel 12, and the coil 32 and the magnets 33 are further positioned outside the lens carrier 31. That is, when the configuration described above is employed, the diameter of the lens carrier 31 is greater than that of the lens barrel 12, and the coil 32 and the magnets 33 are further positioned outside the large-diameter lens carrier 31, disadvantageously resulting in an increased size of the imaging apparatus 10 itself.

On the other hand, since the imaging apparatus 100 shown in the lower portion of FIG. 4, to which the first embodiment of the invention is applied, has the configuration described above, the lens carrier 121 is positioned outside the lens barrel 102 but inside the largest-diameter portion (outer diameter) of the lens barrel 102. Further, the coil 123 and the magnets 124 positioned outside the lens carrier 121 are positioned inside the outer diameter of the lens barrel 102. Since none or only part of the lens carrier 121, the coil 123, and the magnets 124 is thus positioned outside the outer diameter of the lens barrel 102, the size of the imaging apparatus 100 itself is reduced.

In other words, the diameter of the lens barrel 102 on the side where the imaging device 103 is present is large, whereas the diameter of the lens barrel 102 on the opposite side is small. Since the diameters of the two portions of the lens barrel 102 differ from each other, a space is created where the difference is present. Accommodating drive means (the coil 123, the magnets 124, and the yokes in this case) for vertically moving the lens carrier 121 relative to the imaging plane of the imaging device 103 in the space allows the size of the imaging apparatus 100 to be reduced.

As described above, the size of the imaging apparatus can be reduced by applying the invention. Further, the size reduction will not degrade the quality of a captured image.

The focus adjustment carried out at the time of manufacture by using the engagement between the lens barrel 102 and the lens carrier 121 can be carried out in the same manner as the imaging apparatus 10 of related art.

Second Embodiment

Figure 5A:
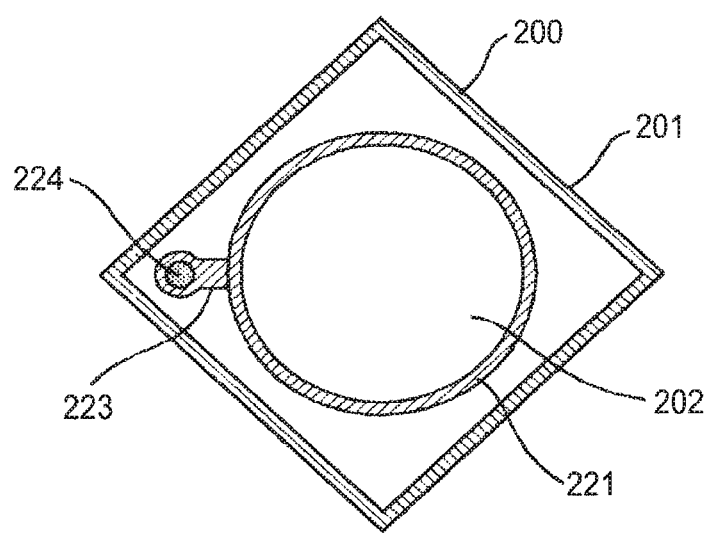
FIGS. 5A and 5B show the configuration of an exemplary imaging apparatus of related art for comparison.
Figure 5B:
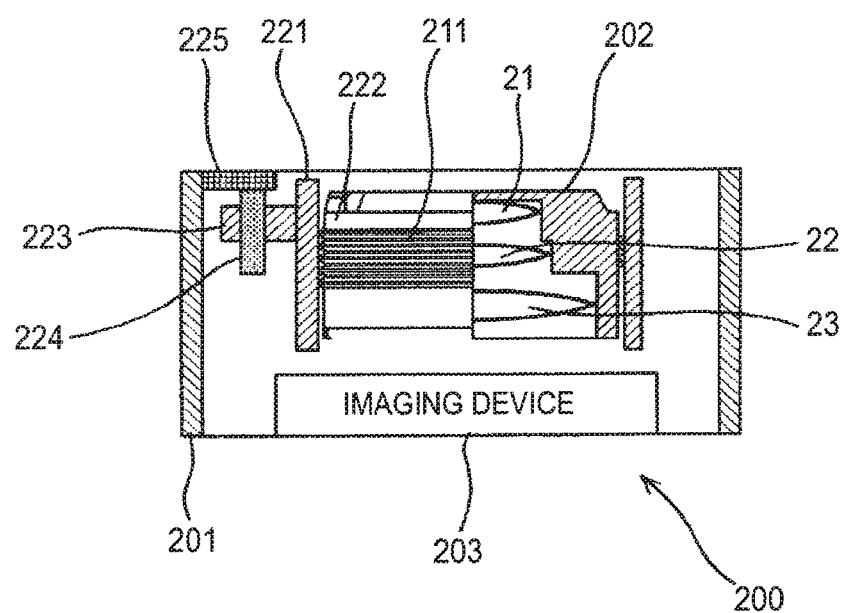

A second embodiment will be described below. The second embodiment relates to a case where a piezoelectric device is used to perform autofocusing. A piezoelectric device is a passive device using a piezoelectric effect in which a force applied to a piezoelectric member is converted into a voltage and vice versa. To describe an imaging apparatus using a piezoelectric device to perform autofocusing, the configuration of an imaging apparatus of related art is first shown in FIGS. 5A and 5B for comparison. FIG. 5A is a top view of an imaging apparatus 200, and FIG. 5B is a side view (cross-sectional view) of the imaging apparatus 200.

The imaging apparatus 200 includes a housing 201, a lens barrel 202, and an imaging device 203. Lenses 21, 22, and 23 are assembled into the lens barrel 202 and held therein. A thread 211 is provided on the outer side surface of the lens barrel 202.

A lens carrier 221 is provided in the housing 201. A thread 222 is provided on the inner side (inner diameter) of the lens carrier 221. A slide hook 223 is provided in a predetermined position on the outer (outer shape) side surface of the lens carrier 221. One of the ends of the slide hook 223 is connected to the lens carrier 221, and the other end has a circular shape having a circular hole at the center thereof. A shaft 224 passes through the hole.

A piezoelectric device 225 fixed to the housing 201 is attached to the shaft 224. When a current is conducted through the piezoelectric device 225, a force is produced and then the slide hook 223 slides. When the slide hook 223 slides, the lens carrier 221 moves relative to the housing 201 in the upward or downward direction (the direction toward or away from the imaging device 203). Autofocusing is thus performed.

In the imaging apparatus 200 of related art shown in FIGS. 5A and 5B, the lens carrier 221 is positioned outside the lens barrel 202 and the slide hook 223, the shaft 224, and the piezoelectric device 225 are further positioned outside the lens carrier 221. That is, when the configuration described above is employed, the diameter of the lens carrier 221 is greater than that of the lens barrel 202, and the slide hook 223, the shaft 224, and the piezoelectric device 225 are further positioned outside the large-diameter lens carrier 221, resulting in an increased size of the imaging apparatus 200 itself.

Figure 6A:
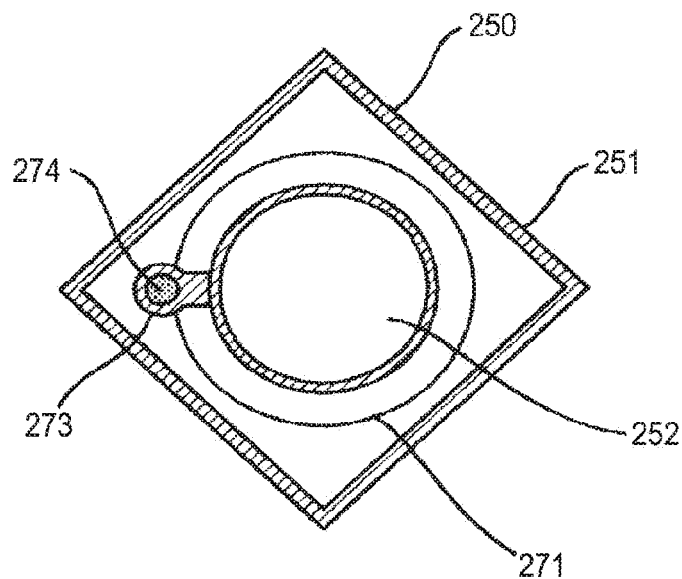
FIGS. 6A and 6B show the configuration of the imaging apparatus of another embodiment to which the invention is applied.
Figure 6B:
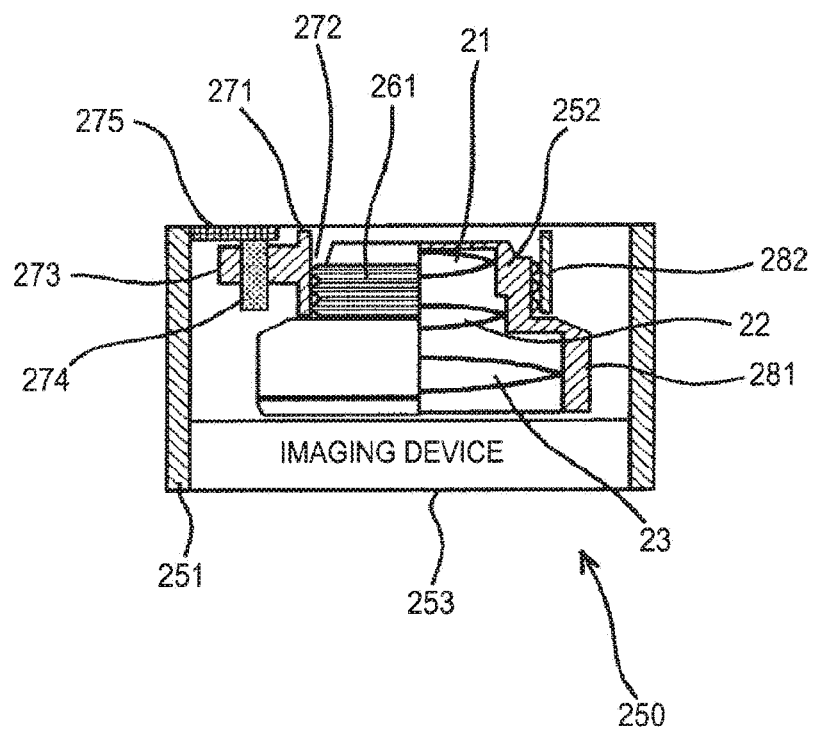

To address the problem, the imaging apparatus in the second embodiment to which the invention is applied has the configuration shown in FIGS. 6A and 6B to reduce the size of the imaging apparatus. FIG. 6A is a top view of an imaging apparatus 250, and FIG. 6B is a side view (cross-sectional view) of the imaging apparatus 250.

The imaging apparatus 250 shown in FIGS. 6A and 6B has a configuration that is basically the same as that of the imaging apparatus 200 of related art shown in FIGS. 5A and 5B. The imaging apparatus 250 includes a housing 251, a lens barrel 252, and an imaging device 253. Lenses 21, 22, and 23 are assembled into the lens barrel 252 and held therein. A thread 261 is provided on the outer side surface of the lens barrel 252.

A lens carrier 271 is provided in the housing 251. A thread 272 is provided on the inner side (inner diameter) of the lens carrier 271. A slide hook 273 is provided in a predetermined position on the outer (outer shape) side surface of the lens carrier 271. One of the ends of the slide hook 273 is connected to (integrated with) the lens carrier 271, and the other end has a circular shape having a circular hole at the center thereof. A shaft 274 passes through the hole.

A piezoelectric device 275 fixed to the housing 251 is attached to the shaft 274. When a current is conducted through the piezoelectric device 275, a force is produced and then the slide hook 273 slides. When the slide hook 273 slides, the lens carrier 271 moves relative to the housing 251 in the upward or downward direction (the direction toward or away from the imaging device 253). Autofocusing is thus performed.

The structure of the lens barrel 252 will further be described. Referring to FIG. 6B, the lens barrel 252 has a stepped shape, a shape having two stepped sections in the configuration shown in FIG. 6B. A stepped section 281 contains the lens 23, and a stepped section 282 contains the lenses 21 and 22. As shown in FIG. 6B, the sizes of the lenses 21 to 23 satisfy the following relationship.

lens 21<lens 22<lens 23

The diameter of the stepped section 281 containing the lens 23 is therefore larger than that of the stepped section 282 containing the lenses 21 and 22. The diameter of the stepped section 281 is slightly larger than that of the lens 23. The diameter of the stepped section 282 is slightly larger than that of the lens 22 but smaller than that of the lens 23.

The thread 261 is provided on the stepped section 282. The thread 261 provided on the stepped section 282 engages the thread 272 provided on the lens carrier 271. The diameter of the lens carrier 271 is sized in such a way that the thread 261 engages the thread 272. The diameter of the lens carrier 271 is therefore sized to be slightly larger than that of the stepped section 282.

Further, the height of the stepped section 282 is shorter than the height of the lens carrier 271. The height used herein means the length in the up-down direction in FIG. 6B (the direction toward or away from the imaging device 253). The height of the lens carrier 271 is determined in such a way that the stepped section 281 of the lens barrel 252 does not come into contact with an end of the lens carrier 271 when the lens barrel 252 is fixed to the lens carrier 271.

The imaging apparatus 200 of related art is now compared with the imaging apparatus 250 in the second embodiment. Each of the imaging apparatus 200 and the imaging apparatus 250 includes the lenses 21 to 23. The imaging apparatus 200 and the imaging apparatus 250 therefore do not differ from each other in terms of optical system and can hence capture images having the same image quality. Further, the imaging device 203 in the imaging apparatus 200 and the imaging device 253 in the imaging apparatus 250 have the same number of pixels and can capture images having the same image quality in this regard as well.

It is, however, obvious that the imaging apparatus 250 is smaller than the imaging apparatus 200. The reason for this is that the lens barrel 252 in the imaging apparatus 250 has a stepped shape and the diameter of the stepped section 282 accommodating the smaller lenses is smaller the diameter of the stepped section 281 accommodating the larger lens. The size of the imaging apparatus 250 can be reduced accordingly. The size of the imaging apparatus 250 is reduced because the space created by the difference between the stepped sections 281 and 282, specifically, the difference in diameter between the stepped sections 281 and 282, accommodates all or part of the lens carrier 271, the slide hook 273, and the shaft 274.

That is, the size of the imaging apparatus 250 can be reduced by shaping the lens barrel 252 in such a way that the diameter thereof gradually decreases in correspondence with the sizes of the lenses to be accommodated, providing the thread 261 on the stepped section having the smaller diameter so that the threaded portion engages the lens carrier 271, and assembling a driver including the slide hook 273, the shaft 274, and the piezoelectric device 275 on the side where the diameter is smaller.

In the above description of "shaping the lens barrel 252 in such a way that the diameter thereof gradually decreases in correspondence with the sizes of the lenses to be accommodated," "the diameter thereof gradually decreases" means that the following shapes can be employed. That is, for example, a stepped shape, like the stepped sections 281 and 282 shown in FIG. 6B, can be employed. Although not shown, when three lenses, such as the lenses 21 to 23 shown in FIG. 6B, are incorporated, a stepped shape not formed of two stepped sections but formed of three stepped sections corresponding to the number of lenses can be employed.

Alternatively, although not shown, instead of a stepped shape, for example, a cone shape (part of a cone shape) whose diameter gradually and continuously decreases in the direction away from the imaging device 253 can be employed. Still alternatively, for example, a combined shape in which the threaded portion (corresponding to the stepped section 282 in FIG. 6B) has a cylindrical shape and the non-threaded portion (corresponding to the stepped section 281 in FIG. 6B) has part of a cone shape can be employed. Still alternatively, any shape one can think of from the shapes described above can be employed.

The imaging apparatus 200 of related art shown in FIGS. 5A and 5B disadvantageously has a structure that causes an increase in size of the imaging apparatus 200 itself, as described above. However, since the imaging apparatus 250 shown in FIGS. 6A and 6B, to which the second embodiment of the invention is applied, has the configuration described above, the lens carrier 271 is positioned outside the lens barrel 252 but inside the largest-diameter portion of the lens barrel 252.

Further, all or part of the driver including the slide hook 273, the shaft 274, and the piezoelectric device 275 positioned outside the lens carrier 271 is positioned inside the largest-diameter portion (largest outer diameter) of the lens barrel 252. Since none or only part of the lens carrier 271, the slide hook 273, the shaft 274, and the piezoelectric device 275 is thus positioned outside the largest outer diameter of the lens barrel 252, the size of the imaging apparatus 250 itself is reduced.

In other words, the diameter of the lens barrel 252 on the side where the imaging device 253 is present is large, whereas the diameter of the lens barrel 252 on the opposite side is small. Since the diameters of the two portions of the lens barrel 252 differ from each other, a space is created where the difference is present. Accommodating drive means (the slide hook 273, the shaft 274, and the piezoelectric device 275 in this case) for vertically moving the lens carrier 271 relative to the imaging plane of the imaging device 253 in the space allows the size of the imaging apparatus 250 to be reduced.

As described above, the size of the imaging apparatus can be reduced by applying the invention.

The focus adjustment carried out at the time of manufacture by using the engagement between the lens barrel 252 and the lens carrier 271 can be carried out in the same manner as the imaging apparatus 200 of related art.

The imaging apparatus 250 shown in FIGS. 6A and 6B includes one set of the slide hook 273 and the shaft 274, two to four sets of a slide hook and a shaft can be provided. The sets of a slide hook and a shaft other than the set of the slide hook 273 and the shaft 274 are provided to support the lens carrier 271 but provided with no piezoelectric device. Providing a plurality of sets of a slide hook and a shaft in the imaging apparatus 250 does not increase the size of the configuration of the imaging apparatus 250, but the imaging apparatus 250 can still be reduced in size.

Third Embodiment

Figure 7A:
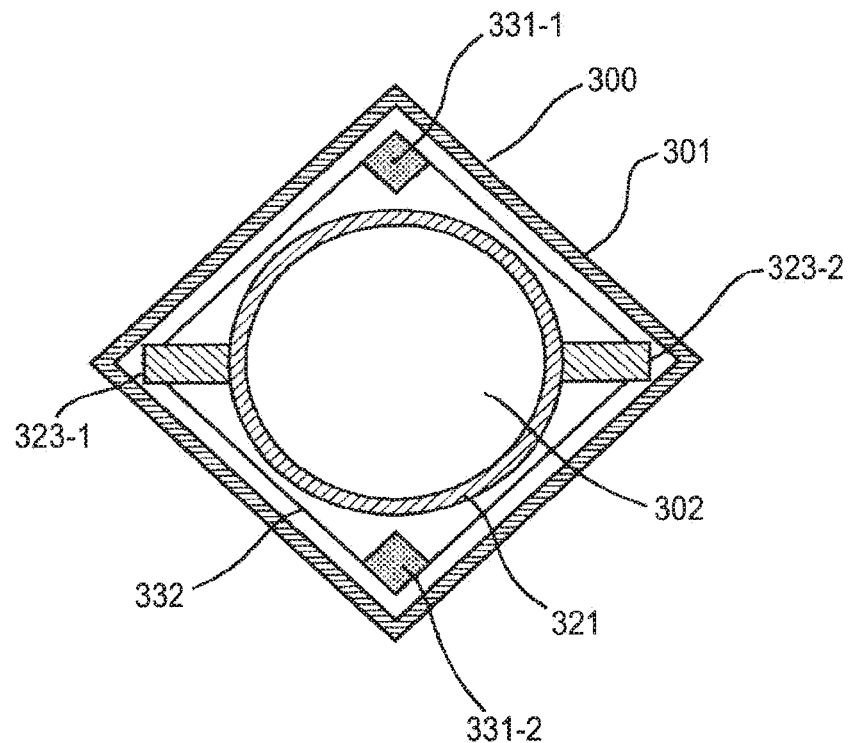
FIGS. 7A and 7B show the configuration of an exemplary imaging apparatus of related art for comparison.
Figure 7B:
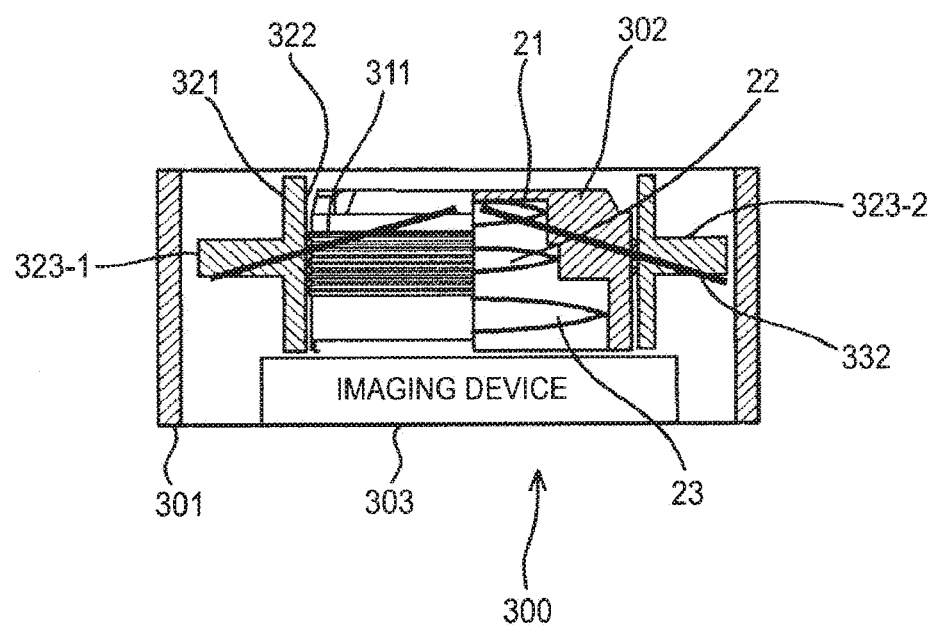

A third embodiment will be described below. The third embodiment relates to a case where a wire made of a shape memory alloy is used to perform autofocusing. A shape memory alloy is characterized in that the length thereof increases or decreases when a current is conducted therethrough. To describe an imaging apparatus using a wire made of a shape memory alloy to perform autofocusing, the configuration of an imaging apparatus of related art is first shown in FIGS. 7A and 7B for comparison. FIG. 7A is a top view of an imaging apparatus 300, and FIG. 7B is a side view (cross-sectional view) of the imaging apparatus 300.

The imaging apparatus 300 includes a housing 301, a lens barrel 302, and an imaging device 303. Lenses 21, 22, and 23 are assembled into the lens barrel 302 and held therein. A thread 311 is provided on the outer side surface of the lens barrel 302.

A lens carrier 321 is provided in the housing 301. A thread 322 is provided on the inner side (inner diameter) of the lens carrier 321. Hooks 323-1 and 323-2 are provided in predetermined positions on the outer (outer shape) side surface of the lens carrier 321. The hooks 323-1 and 323-2 are disposed on opposite sides of the lens carrier 321. A wire 332 made of a shape memory alloy is hooked to the hooks 323-1 and 323-2 (hereinafter simply referred to as the hooks 323 when they are not necessary to be distinguished and the same applies to other portions in the following description).

The wire 332 is also connected to electrodes 331-1 and 331-2. When a current is conducted from the electrodes 331-1 and 331-2 through the wire 332 and the temperature thereof increases, the wire 332 made of a shape memory alloy decreases in length. When the length of the wire 332 decreases, the hooks 323 to which the wire 332 is hooked are lifted relative to the housing 301.

Since the hooks 323 are integrated with the lens carrier 321, the hooks 323 lifted relative to the housing 301 lift the lens carrier 321 relative to the housing 301. In this way, the lens carrier 321 is driven. Conversely, when the current flowing through the wire 332 is terminated, the temperature thereof decreases and the length thereof increases. When the length of the wire 332 increases (returns back to its original length), the hooks 323 and hence the lens carrier 321 are lowered.

The lens barrel 302, which holds the lenses, fits into the lens carrier 321. Driving the lens carrier 321 in the way described above therefore changes the position of the lenses held in the lens barrel 302 and hence the focal distance is adjusted. That is, autofocusing is performed.

In the imaging apparatus 300 of related art shown in FIGS. 7A and 7B, the lens carrier 321 is positioned outside the lens barrel 302, and the hooks 323, the wire 332, and the electrodes 331 are further positioned outside the lens carrier 321. That is, when the configuration described above is employed, the diameter of the lens carrier 321 is greater than that of the lens barrel 302, and the hooks 323, the wire 332, and the electrodes 331 are further positioned outside the large-diameter lens carrier 321, resulting in an increased size of the imaging apparatus 300 itself.

Figure 8A:
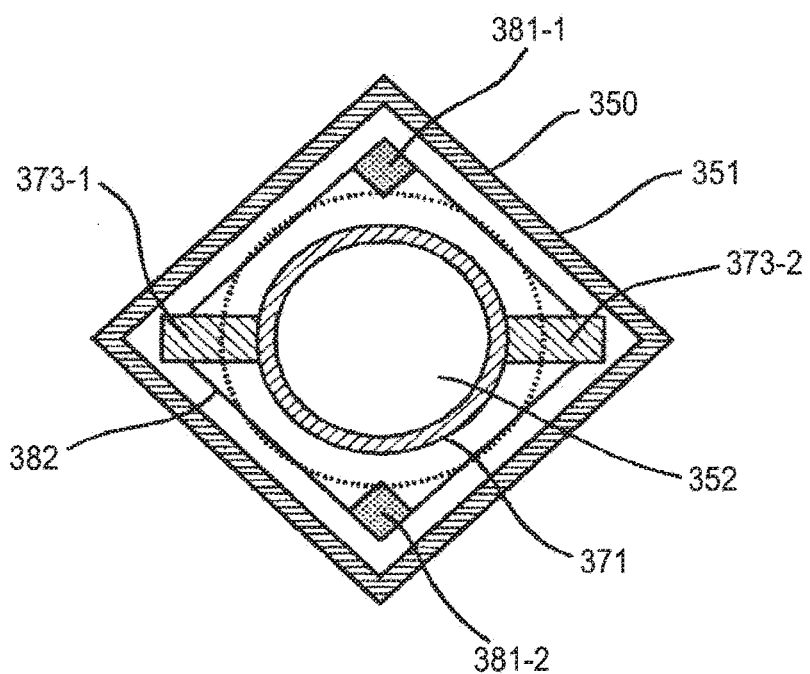
FIGS. 8A and 8B show the configuration of the imaging apparatus of another embodiment to which the invention is applied.
Figure 8B:
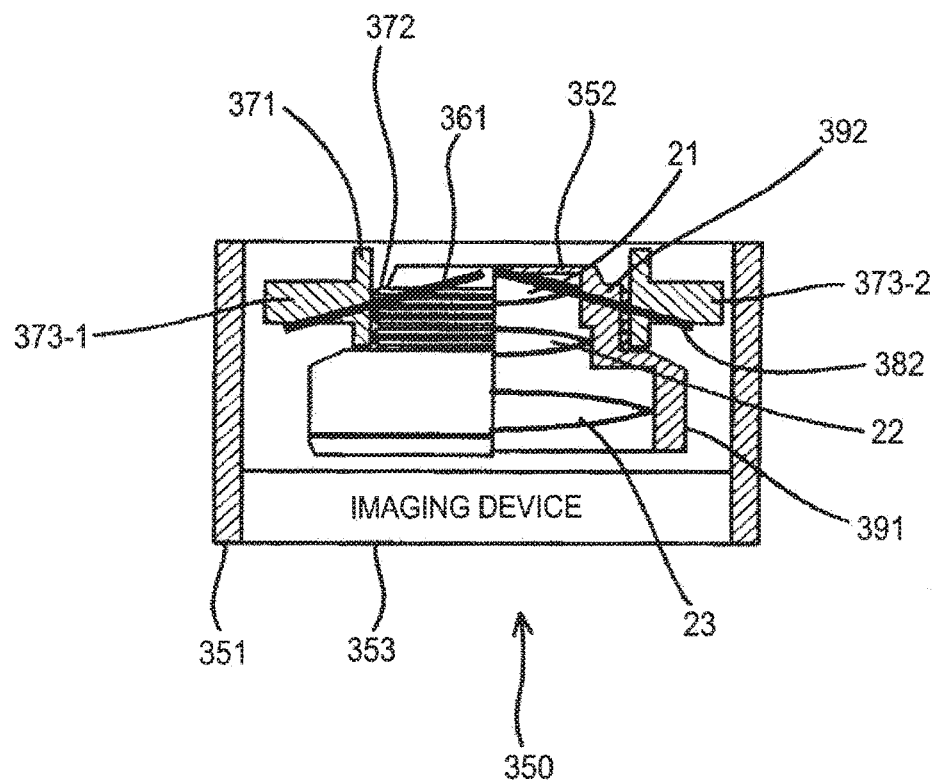

To address the problem, the imaging apparatus in the third embodiment to which the invention is applied has the configuration shown in FIGS. 8A and 8B to achieve size reduction. FIG. 8A is a top view of an imaging apparatus 350, and FIG. 8B is a side view (cross-sectional view) of the imaging apparatus 350.

The imaging apparatus 350 shown in FIGS. 8A and 8B has a configuration that is basically the same as that of the imaging apparatus 300 of related art shown in FIGS. 7A and 7B. The imaging apparatus 350 includes a housing 351, a lens barrel 352, and an imaging device 353. Lenses 21, 22, and 23 are assembled into the lens barrel 352 and held therein. A thread 361 is provided on the outer side surface of the lens barrel 352.

A lens carrier 371 is provided in the housing 351. A thread 372 is provided on the inner side (inner diameter) of the lens carrier 371. Hooks 373-1 and 373-2 are provided in predetermined positions on the outer (outer shape) side surface of the lens carrier 371. The hooks 373-1 and 373-2 are disposed on opposite sides of the lens carrier 371. A wire 382 made of a shape memory alloy is hooked to the hooks 373-1 and 373-2.

The wire 382 is also connected to electrodes 381-1 and 381-2. When a current is conducted from the electrodes 381-1 and 381-2 through the wire 382 and the temperature thereof increases, the wire 382 made of a shape memory alloy decreases in length. When the length of the wire 382 decreases, the hooks 373 to which the wire 382 is hooked are lifted relative to the housing 351.

Since the hooks 373 are integrated with the lens carrier 371, the hooks 373 lifted relative to the housing 351 lift the lens carrier 371 relative to the housing 351. In this way, the lens carrier 371 is driven. Conversely, when the current flowing through the wire 382 is terminated, the temperature thereof decreases and the length thereof increases. When the length of the wire 382 increases (returns back to its original length), the hooks 373 and hence the lens carrier 371 are lowered.

The lens barrel 352, which holds the lenses, fits into the lens carrier 371. Driving the lens carrier 371 in the way described above therefore changes the position of the lenses held in the lens barrel 352 and hence the focal distance is adjusted. That is, autofocusing is performed.

The structure of the lens barrel 352 will further be described. Referring to FIG. 8B, the lens barrel 352 has a stepped shape, a shape having two stepped sections in the configuration shown in FIG. 8B. A stepped section 391 contains the lens 23, and a stepped section 392 contains the lenses 21 and 22. As shown in FIG. 8B, the sizes of the lenses 21 to 23 satisfy the following relationship.

lens 21<lens 22<lens 23

The diameter of the stepped section 391 containing the lens 23 is therefore larger than that of the stepped section 392 containing the lenses 21 and 22. The diameter of the stepped section 391 is slightly larger than that of the lens 23. The diameter of the stepped section 392 is slightly larger than that of the lens 22 but smaller than that of the lens 23.

The thread 361 is provided on the stepped section 392. The thread 361 provided on the stepped section 392 engages the thread 372 provided on the lens carrier 371. The diameter of the lens carrier 371 is sized in such a way that the thread 361 engages the thread 372. The diameter of the lens carrier 371 is therefore sized to be slightly larger than that of the stepped section 392.

Further, the height of the stepped section 392 is shorter than the height of the lens carrier 371. The height used herein means the length in the up-down direction in FIG. 8B (the direction toward or away from the imaging device 353). The height of the lens carrier 371 is determined in such a way that the stepped section 391 of the lens barrel 352 does not come into contact with an end of the lens carrier 371 when the lens barrel 352 is fixed to the lens carrier 371.

The length of the hooks 373 attached to the lens carrier 371 is sized in such a way that part of the tips of the hooks 373 extends off the largest diameter (largest outer diameter) of the lens barrel 352 or the tips are preferably within the diameter of the lens barrel 352.

The imaging apparatus 300 (FIGS. 7A and 7B) of related art is now compared with the imaging apparatus 350 (FIGS. 8A and 8B) in the third embodiment. Each of the imaging apparatus 300 and the imaging apparatus 350 includes the lenses 21 to 23. The imaging apparatus 300 and the imaging apparatus 350 therefore do not differ from each other in terms of optical system and can hence capture images having the same image quality. Further, the imaging device 303 in the imaging apparatus 300 and the imaging device 353 in the imaging apparatus 350 have the same size or the same number of pixels and can capture images having the same image quality in this regard as well.

It is, however, obvious that the imaging apparatus 350 is smaller than the imaging apparatus 300. The reason for this is that the lens barrel 352 in the imaging apparatus 350 has a stepped shape and the diameter of the stepped section 392 accommodating the smaller lenses is smaller than the diameter of the stepped section 391 accommodating the larger lens. The size of the imaging apparatus 350 can be reduced accordingly. The size of the imaging apparatus 350 is reduced because the space created by the difference between the stepped sections 391 and 392, specifically, the difference in diameter between the stepped sections 391 and 392, accommodates all or part of the lens carrier 371, the hooks 373, and the electrodes 381.

That is, the size of the imaging apparatus 350 can be reduced by shaping the lens barrel 352 in such a way that the diameter thereof gradually decreases in correspondence with the sizes of the lenses to be accommodated, providing the thread 361 on the stepped section having the smaller diameter so that the threaded portion engages the lens carrier 371, and assembling a driver including the hooks 373, the electrodes 381, and the wire 382 on the side where the diameter is smaller.

In the above description of "shaping the lens barrel 352 in such a way that the diameter thereof gradually decreases in correspondence with the sizes of the lenses to be accommodated," "the diameter thereof gradually decreases" means that the following shapes can be employed. That is, for example, a stepped shape, like the stepped sections 391 and 392 shown in FIG. 8B, can be employed. Although not shown, when three lenses, such as the lenses 21 to 23 shown in FIG. 8B, are incorporated, a stepped shape not formed of two stepped sections but formed of three stepped sections corresponding to the number of lenses can be employed.

Alternatively, although not shown, instead of a stepped shape, for example, a cone shape (part of a cone shape) whose diameter gradually and continuously decreases in the direction away from the imaging device 353 can be employed. Still alternatively, for example, a combined shape in which the threaded portion (corresponding to the stepped section 392 in FIG. 8B) has a cylindrical shape and the non-threaded portion (corresponding to the stepped section 391 in FIG. 8B) has part of a cone shape can be employed. Still alternatively, any shape one can think of from the shapes described above can be employed.

The imaging apparatus 300 of related art shown in FIGS. 7A and 7B disadvantageously has a structure that causes an increase in size of the imaging apparatus 300 itself, as described above. However, since the imaging apparatus 350 shown in FIGS. 8A and 8B, to which the third embodiment of the invention is applied, has the configuration described above, the lens carrier 371 is positioned outside the lens barrel 352 but inside the largest-diameter (outer diameter) portion of the lens barrel 352.

Further, all or part of the driver including the hooks 373, the electrodes 381, and the wire 382 positioned outside the lens carrier 371 is positioned inside the largest-diameter portion of the lens barrel 352. Since none or only part of the lens carrier 371, the hooks 373, the electrodes 381, and the wire 382 is thus positioned outside the largest diameter of the lens barrel 352, the size of the imaging apparatus 350 itself is reduced.

In other words, the diameter of the lens barrel 352 on the side where the imaging device 353 is present is large, whereas the diameter of the lens barrel 352 on the opposite side is small. Since the diameters of the two portions of the lens barrel 352 differ from each other, a space is created where the difference is present. Accommodating drive means (the hooks 373, the electrodes 381, and the wire 382 in this case) for vertically moving the lens carrier 371 relative to the imaging plane of the imaging device 353 in the space allows the size of the imaging apparatus 350 to be reduced.

As described above, the size of the imaging apparatus can be reduced by applying the invention. Further, the size reduction will not degrade the quality of a captured image.

The focus adjustment carried out at the time of manufacture by using the engagement between the lens barrel 352 and the lens carrier 371 can be carried out in the same manner as the imaging apparatus 300 of related art.

The imaging apparatus 350 shown in FIGS. 8A and 8B includes the two hooks 373, the two electrodes 381, and the wire 382 connected to the hooks 373 and the electrodes 381 and surrounding the lens carrier 371. The imaging apparatus 350 may alternatively include one of the hooks 373, the two electrodes 381, and the wire 382 connected to the hook 373 and the electrodes 381 and surrounding the lens carrier 371. That is, the imaging apparatus 350 can, for example, be configured in such a way that the ends of the wire 382 are connected to the electrodes 381-1 and 381-2 and the hook 373-1 (or hook 373-2) is positioned in a central portion of the wire 382.

The configuration described above does not increase the size of the configuration of the imaging apparatus 350, but the imaging apparatus 350 can still be reduced in size.

The above first to third embodiments have been described with reference to a case where the lens closer to the imaging device is larger and the size of the lenses decreases in the direction away from the imaging device. The invention is, however, not limited to the lens layout described above. That is, for example, the invention can be applied to a case where the lens farther away from the imaging device is larger and the size of the lenses decreases in the direction toward the imaging device.

When the lens layout described above is employed, the threads and the driver are provided on the side where the stepped portion accommodating smaller lenses is present. The size of the imaging apparatus can, of course, be reduced even when the lens layout described above is employed, as in the above embodiments.

The above embodiments have been described with reference to the imaging apparatus including the three lenses 21 to 23, but the invention is not necessarily applied to an imaging apparatus including three lenses. That is, the invention can be applied to an imaging apparatus including a plurality of lenses 21 to 24, as shown in FIG. 9.

Figure 9:
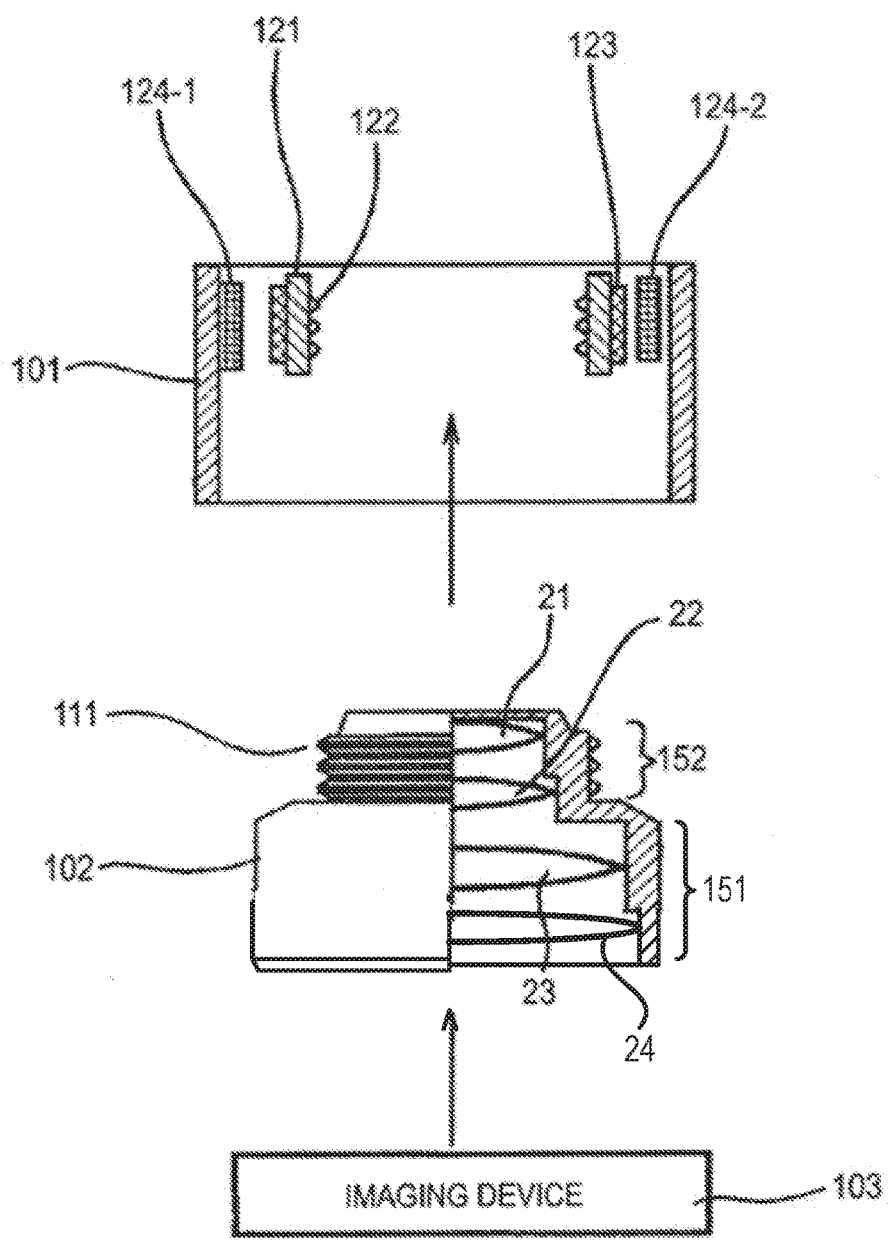
FIG. 9 shows the configuration of the imaging apparatus of another embodiment to which the invention is applied.

When a plurality of lenses, such as lenses 21 to 23 shown in FIG. 3 or lenses 21 to 24 shown in FIG. 9, are provided and the diameter of the lenses increases (or decreases) toward the imaging device, the lens barrel holding the plurality of lenses is configured not to simply have a cylindrical shape but have a stepped shape according to the diameters of the lenses or a shape at least part of which gradually decreases in diameter. Shaping the lens carrier that holds the lens barrel in accordance with the shape of the lens barrel provides a sufficient space between the lens carrier and the inner wall of the lens module on the side where a subject is present, whereby the actuator can be disposed in the space. The lens module can therefore be reduced in size.

In an imaging apparatus of related art having a structure in which no thread is provided on the lens barrel and the lens carrier, the focus adjustment with respect to the imaging device may not be carried out. In the present invention, threads are provided on the lens barrel and the lens carrier. Providing threads on the lens barrel and the lens carrier allows the focus adjustment with respect to the imaging device to be carried out, for example, at the time of manufacture.

The stroke typically required to perform autofocusing can be minimized and the requirements on actuator characteristics can be lowered by applying the invention. Further, the resultant smaller stroke or movable range advantageously reduces power consumption.

Embodiments of the invention are not limited to those described above, but a variety of changes can be made to the extent that they do not depart from the spirit of the invention.

The present application contains subject matter related to that disclosed in Japanese Priority Patent Application JP 2009-163284 filed in the Japan Patent Office on Jul. 10, 2009, the entire contents of which is hereby incorporated by reference.

What is claimed:

1. An imaging apparatus comprising:
   a plurality of lenses including a first lens, a second lens, and a third lens arranged in this order from a light incident side, wherein a diameter of the first lens is smaller than a diameter of the second lens and the diameter of the second lens is smaller than a diameter of the third lens;
   a first member configured to hold the plurality of lenses, the first member including a first portion and a second portion, wherein the first portion has a first outer diameter and the second portion has a second outer diameter that is smaller than the first outer diameter;
   a second member engaged with the second portion of the first member;

an imaging device configured to receive an incident light through the plurality of lenses;

a driving member configured to drive the first member in a vertical direction relative to the imaging device, the driving member including a coil disposed on the second member and a magnet disposed opposite to the coil; and a housing configured to surround the first member, the second member, and the driving member, wherein a virtual line between an inner surface of the housing at a point opposite to the driving device in a horizontal direction, and an outer surface of the imaging device lies in a virtual plane extending in the vertical direction.

2. The imaging apparatus according to claim 1, wherein the first portion has a first inner diameter and the second portion has a second inner diameter that is smaller than the first inner diameter.

3. The imaging apparatus according to claim 1, wherein the first portion is configured to engage the third lens.

4. The imaging apparatus according to claim 1, wherein the second portion and the first portion are arranged in this order from the light incident side.

5. The imaging apparatus according to claim 1, wherein an outer surface of the first member includes a first thread; an inner surface of the second member includes a second thread; and
the first thread and the second thread are engaged to one another.

6. The imaging apparatus according to claim 1, wherein an inner diameter of the second member is smaller than the first outer diameter of the first member.

7. The imaging apparatus according to claim 1, wherein the first lens, the second lens, and the third lens are fixed relative to one another and movable relative to the imaging device.

8. The imaging apparatus according to claim 1, wherein an inner surface of the first member has a stepped shape.

9. The imaging apparatus according to claim 1, wherein the first member has a shape including a cylindrical portion and a conical portion.

10. The imaging apparatus according to claim 1, further comprising a fourth lens arranged between the third lens and the imaging device, wherein the diameter of the third lens is smaller than a diameter of the fourth lens.

11. A mobile phone, comprising:
an imaging apparatus including:
a plurality of lenses including a first lens, a second lens, and a third lens arranged in this order from a light incident side, wherein a diameter of the first lens is smaller than a diameter of the second lens and the diameter of the second lens is smaller than a diameter of the third lens, a first member configured to hold the plurality of lenses, the first member including a first portion and a second portion, wherein the first portion has a first outer diameter and the second portion has a second outer diameter that is smaller than the first outer diameter, a second member engaged with the second portion of the first member, an imaging device configured to receive an incident light through the plurality of lenses, a driving member configured to drive the first member in a vertical direction relative to the imaging device, the driving member including a coil disposed on the second member and a magnet disposed opposite to the coil, and a housing configured to surround the first member, the second member, and the driving member, wherein a virtual line between an inner surface of the housing at a point opposite to the driving device in a horizontal direction, and an outer surface of the imaging device lies in a virtual plane extending in the vertical direction.

12. The mobile phone according to claim 11, wherein the first portion has a first inner diameter and the second portion has a second inner diameter that is smaller than the first inner diameter.

13. The mobile phone according to claim 11, wherein the first portion is configured to engage the third lens.

14. The mobile phone according to claim 11, wherein the second portion and the first portion are arranged in this order from the light incident side.

15. The mobile phone according to claim 11, wherein
an outer surface of the first member includes a first thread;
an inner surface of the second member includes a second thread; and
the first thread and the second thread are engaged to one another.

16. The mobile phone according to claim 11, wherein an inner diameter of the second member is smaller than the first outer diameter of the first member.

17. The mobile phone according to claim 11, wherein the first lens, the second lens, and the third lens are fixed relative to one another and movable relative to the imaging device.

18. The mobile phone according to claim 11, wherein an inner surface of the first member has a stepped shape.

19. The mobile phone according to claim 11, wherein the first member has a shape including a cylindrical portion and a conical portion.

20. The mobile phone according to claim 11, further comprising a fourth lens arranged between the third lens and the imaging device, wherein the diameter of the third lens is smaller than a diameter of the fourth lens.

* * * * *